US009266652B2

(12) United States Patent
Menard et al.

(10) Patent No.: US 9,266,652 B2
(45) Date of Patent: Feb. 23, 2016

(54) COMPOSITE FILM FOR PACKAGING CONTAINERS, METHOD FOR PRODUCING A COMPOSITE FILM, AND PACKAGING CONTAINER

(75) Inventors: Rico Menard, Kirchberg (CH); Dirk Ekenhorst, Osnabrück (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 14/116,784

(22) PCT Filed: Mar. 20, 2012

(86) PCT No.: PCT/EP2012/054906
§ 371 (c)(1),
(2), (4) Date: Nov. 11, 2013

(87) PCT Pub. No.: WO2012/152492
PCT Pub. Date: Nov. 15, 2012

(65) Prior Publication Data
US 2014/0086513 A1 Mar. 27, 2014

(30) Foreign Application Priority Data

May 9, 2011 (DE) .......................... 10 2011 075 481

(51) Int. Cl.
*B65D 33/00* (2006.01)
*B65D 51/24* (2006.01)
(Continued)

(52) U.S. Cl.
CPC ............ *B65D 51/243* (2013.01); *B31F 1/0077* (2013.01); *B32B 3/10* (2013.01); *B65D 33/01* (2013.01); *B65D 77/225* (2013.01)

(58) Field of Classification Search
CPC ........... B65D 75/5861; B65D 75/5817; B65D 75/70; B65D 75/5833; B65D 5/747; B65D 5/748; B65D 5/749

USPC .............. 383/202, 207–209, 80, 906, 66, 96; 222/81, 83, 83.5; 493/199, 210
See application file for complete search history.

(56) References Cited

U.S. PATENT DOCUMENTS 4,072,233 A * 2/1978 Kramer et al. ................ 383/202
4,429,828 A * 2/1984 Farber ......................... 229/103.1
(Continued)

FOREIGN PATENT DOCUMENTS

EP 1182144 2/2002
GB 2154200 9/1985
(Continued)

OTHER PUBLICATIONS

International Search Report for Application No. PCT/EP2012/054906 dated Jun. 21, 2012 (3 pages).

*Primary Examiner* — Jes F Pascua
(74) *Attorney, Agent, or Firm* — Michael Best & Friedrich LLP

(57) ABSTRACT

The invention relates to a composite film (100) for packaging containers (1), having a film composite made of a plurality of packaging material layers (101 to 108), wherein an inner packaging material layer (108) is designed as a heat-sealing layer and an opening device (10) can be fixed to an outer packaging material layer (101), in particular by sealing to the outer packaging material layer (101), and wherein the packaging material layers (101 to 108) comprise a weakening region (20) in the region of the opening device (10). According to the invention, the weak region (20) is disposed on the side of the inner packaging material layer (108) and is implemented as an at least partial reduction in the layer thickness (D) of the inner packaging material layer (108), wherein the shape of the weak region (20), in particular having a circular cross section, is adapted to the arrangement of cutters (13) that are disposed on a partial circular diameter (T) of the opening device (10) as a part of the opening device (10).

18 Claims, 4 Drawing Sheets

(51) Int. Cl.
  *B32B 3/10* (2006.01)
  *B65D 33/01* (2006.01)
  *B65D 77/22* (2006.01)
  *B31F 1/00* (2006.01)

(56) References Cited

U.S. PATENT DOCUMENTS

| | | | | |
|---|---|---|---|---|
| 5,141,133 | A | * | 8/1992 | Ninomiya et al. ............. 222/83 |
| 5,839,627 | A | * | 11/1998 | Hicks et al. ................ 222/541.9 |
| 6,382,462 | B1 | * | 5/2002 | Ostergaard-Nielsen et al. . 222/1 |
| 6,398,075 | B1 | * | 6/2002 | Laciacera et al. .............. 222/91 |
| 6,598,757 | B2 | * | 7/2003 | Stillinger et al. ............. 220/712 |
| 7,036,683 | B2 | * | 5/2006 | Dubach ........................... 222/83 |
| 7,757,894 | B2 | * | 7/2010 | Kluczynski ................... 222/107 |
| 2003/0128899 | A1 | | 7/2003 | Dennis |
| 2005/0175800 | A1 | | 8/2005 | Staffetti et al. |
| 2014/0233871 | A1 | * | 8/2014 | Barron et al. ................. 383/202 |

FOREIGN PATENT DOCUMENTS

| | | | | |
|---|---|---|---|---|
| WO | | 9619387 | 6/1996 | |
| WO | WO 9746459 | A1 * | 12/1997 | ............ B65D 30/08 |
| WO | | 2007127982 | 11/2007 | |

\* cited by examiner

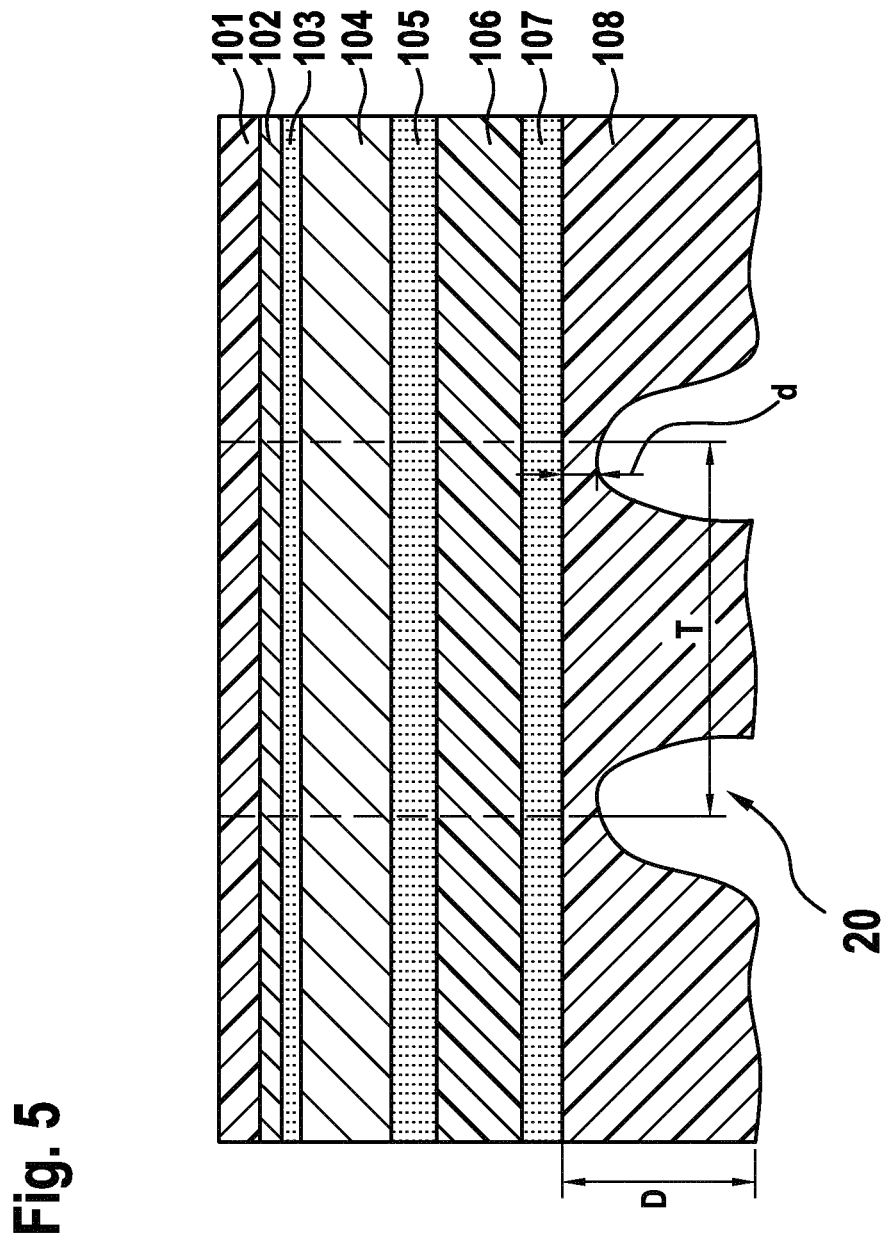

COMPOSITE FILM FOR PACKAGING CONTAINERS, METHOD FOR PRODUCING A COMPOSITE FILM, AND PACKAGING CONTAINER

BACKGROUND OF THE INVENTION

The invention relates to a composite film for packaging containers. The invention further relates to a method for producing a composite film as well as to a packaging container which is made from a composite film.

A composite film for packaging containers is known from the WIPO patent application WO96/19387 A. In this case, the composite film is part of a packaging container having a pouring aperture via which the liquid located inside the packaging container can be removed from said packaging container. In order to facilitate a simplified opening of the packaging container in the region of the opening device, provision is made to equip the known composite film with a weakened region on the side thereof facing the opening device. Two options are thereby described in the patent application mentioned above: on the one hand, a weakening resulting from two cuts arranged in the shape of a cross with respect to one another and on the other hand a reduction in the thickness of the composite film. By means of both measures, it is possible to weaken the packaging container in order to manually pierce or, respectively, open the composite film in the region of the opening device, wherein said composite film is kept intact during the transport or storage of the packaging container and thus the shelf life of the product situated in the packaging container is ensured. In addition, opening devices are addressed in the known patent application which devices have cutters that assist in severing the composite film. More detailed information with regard to the weakening region addressed above can be extracted from the aforementioned patent application.

SUMMARY OF THE INVENTION

Based on the prior art described above, it is the aim of the invention to embody a composite film for packaging containers in such a way that the composite film, in conjunction with an opening device comprising cutters for severing said composite film, allows for a reliable severing of the same while using relatively little effort and expense for implementing the geometry of the cutters being used or other measures. According to the invention, this aim is substantially met by a composite film for packaging containers by virtue of the fact that the weakened region is disposed on the side of the inner packaging material layer of the composite film and is implemented as an at least partial reduction in the layer thickness of the inner packaging material, wherein the shape of the weakened region, in particular having a circular cross section, is adapted to the arrangement of the cutters that are disposed on a partial circular diameter of the opening device as a part of the opening device.

It has become evident during trials that the inner packaging material layer, which typically consists of polyethylene (PE), is relatively difficult for the cutters of the opening device to sever on account of the toughness thereof. The consideration could, of course, then arise to replace the PE with another material; however, PE is particularly suited to being used as the inner packaging material layer in the relevant packaging containers or, respectively, composite films, in particular in tubular bag packagings, due to its sealing capability as well as other properties thereof. Another option could consist of designing the cutters especially sharp or with a specific geometry in order to make possible or facilitate the severing or, respectively, cutting of the inner packaging material layer consisting of polyethylene. This would, however, lead to an increase in costs for producing the opening devices. In contrast, it is possible by means of the composite film described in claim 1 to achieve a reliable severing of the film composite using conventional opening devices or, respectively, cutters.

As previously explained, the inner packaging material layer preferably consists of PE, wherein said PE can have a layer thickness between 50 µm and 200 µm, in particular between 60 µm and 120 µm.

The inner packaging material layer is reduced in the thickness thereof in the weakened region, wherein it is possible in principle to remove (at least partially) the inner packaging layer in the weakened region or to compress said layer, wherein the latter measure can, if need be, likewise lead to a simplified severing of the said inner packaging layer by means of the cutters in the opening device.

The invention also comprises a method for producing an inventive composite film. Provision is thereby made according to the invention for the weakened region to be produced using an anvil-like tool which is pressed with a contact pressing force against the inner packaging material layer and which interacts with an ultrasonic tool that is applied to the outer packaging material layer in alignment with said anvil-like tool. Such a method can be carried out relatively simply and exactly on an industrial scale and is therefore also particularly suited to packaging containers in which foodstuffs are packaged or, respectively, filled and which must be sealed off from ambient air.

It is proposed in one constructive embodiment of the invention that the tool has an annular cross section and that the diameter of the tool is adapted to the partial circular diameter of the cutters of the opening device.

A further aspect relates to the location where the weakened region is to be produced. To this end, it is proposed in a first method according to the invention that the weakened region be produced during the manufacturing process of the composite film. In other words, this means that the weakened regions are produced by the packaging material producer during the manufacture of the composite film. This has the advantage that the actual packaging machine for producing the packaging container or for filling the packaging container can be constructed relatively simply and cost effectively and that no process assurance measures for monitoring the proper production of the weakened regions have to be taken.

In an alternative embodiment, it is however possible for the weakened regions to be produced directly at the packaging machine during the manufacturing process of the packaging containers. This has the advantage that one and the same composite film can continue to be used, for example, when the format of the opening devices is changed, wherein the weakened regions are in each case adapted or, respectively, produced in a format-dependent manner directly at the packaging machine.

Packaging containers, in particular tubular bag packagings, which are produced from a composite film in accordance with the invention or are produced according to an inventive method for producing a composite film have the advantage that they can be easily and reliably opened by the user, wherein the packaged good or rather the foodstuff contained in the packagings is well protected against environmental damage during transport and/or storage thereof.

BRIEF DESCRIPTION OF THE DRAWINGS

Further advantages, features and details of the invention ensue from the following description of exemplary embodiments as well as with the aid of the drawings.

In the drawings:

FIGS. 4 and 5 show the composite film pursuant to FIG. 3, prior to and after the processing of the inner packaging material layer, in each case in longitudinal section.

DETAILED DESCRIPTION

Figure 1:
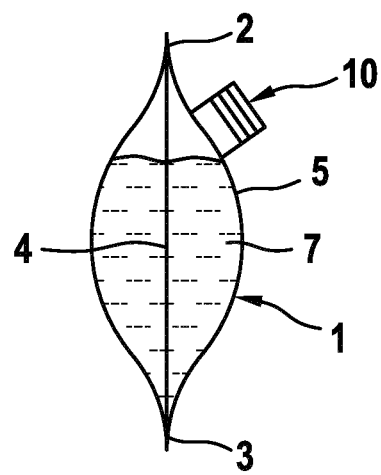
FIG. 1 shows a section through a tubular bag packaging produced from a composite in accordance with the invention.

The same components or components serving the same function are denoted in the figures with the same reference numerals.

In FIG. 1, a packaging container in the shape of a tubular bag packaging 1 is depicted as said container is produced on a so-called tubular bag machine and is known from the prior art. The tubular bag packaging 1 consists of composite film 100, which will be explained in more detail below, and has an upper transverse seam 2, a lower transverse seam 3 as well as at least one longitudinal seam 4. An opening device 10 is attached to the exterior side 5 of the tubular bag packaging, in particular by a sealing process, preferably by ultrasonic sealing. The interior of the tubular bag packaging 1 is filled with a bulk material 7, in particular a liquid such as juice, milk or something similar.

Figure 2:
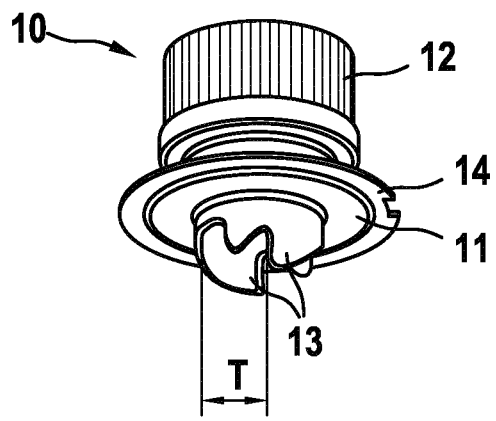
FIG. 2 shows an opening device, as is used with a tubular bag packaging pursuant to FIG. 1, in a perspective view.

The opening device 10 is shown in more detail in FIG. 2. The opening device 10 comprises a screw cap closure 12 which can be removed as a separate piece from the opening device 10 in order to extract the bulk material 7. In addition, the opening device 10 consisting of in particular PP (polypropylene) has a radially circumferential attachment flange 14 which can be heat-sealed to the exterior side 5 of the tubular bag packaging 1. In the exemplary embodiment, two cutters 13 disposed 180 offset to one another protrude out of the bottom side 11 of the opening device 10. Said cutters 13 are disposed above the bottom side 11 when the tubular bag packaging 1 has not yet been opened and protrude from the bottom side 11 when the screw cap closure 12 is being unscrewed under simultaneous rotation by means of a mechanism and thereby selectively pierce or sever the composite film 100 in order to form a passage opening in the tubular bag packaging 10. The cutters 13 are disposed on a partial circular diameter T.

Such an opening device 10 is known per se from the prior art just as the cutters 13 thereof as well as the mechanism required to actuate said cutters 13. The aforementioned components are therefore not explained in detail below as they are not considered to be essential to the invention.

Figure 3:
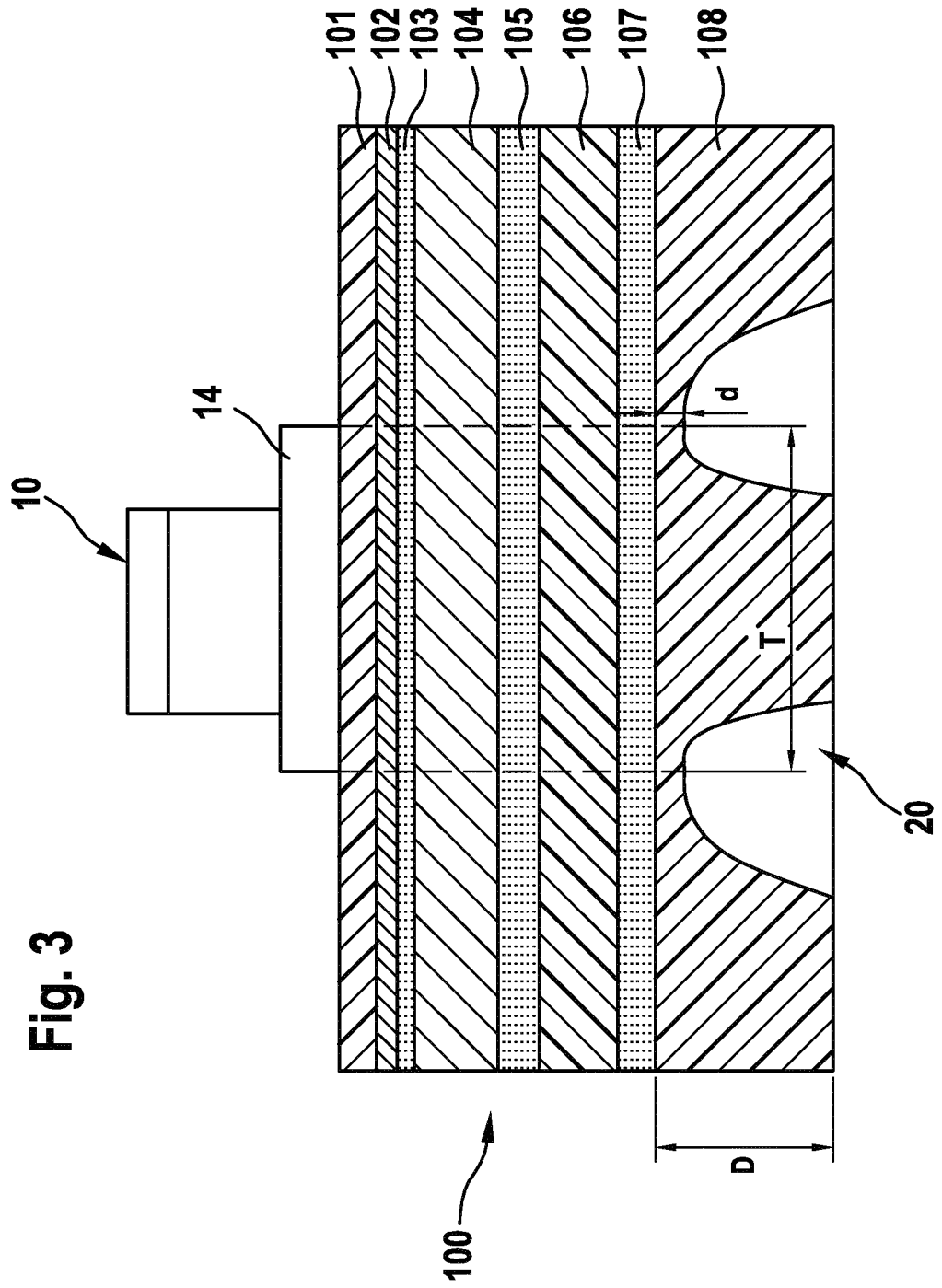
FIG. 3 shows a partial region of the composite film, comprising an opening device attached thereto, in a longitudinal section thereof

In FIG. 3, a section through the composite film 100 is depicted in the region of the opening device 10 connected to the composite film 100, wherein the size of the opening device 10 is drawn below scale and can only be considered in the arrangement thereof with respect to the composite film 100. The composite film 100 consists of a plurality of packaging material layers. The outside of the tubular bag packaging 1 is formed by an OPP layer (oriented polypropylene), which is adjoined by a printed graphics layer 102. The printed graphics layer 102 is connected to a barrier layer 104 via an adhesive layer 104. The barrier layer 104 consists, for example, of aluminum or metalized PET (polyethylene terephthalate). A further layer 106 made of OPA (biaxially oriented polyamide) optionally adjoins the barrier layer 104 via a further adhesive layer 105. The layer 106 is connected via an adhesive layer 107 to the PE layer 108 (polyethylene) which bonds the inside of the tubular bag packaging 1. The PE layer 108 has a thickness D between 50 µm and 200 µm, in particular between 60 µm and 120 µm.

It should be additionally noted that the described layer configuration of the composite film 100 is only presented by way of example and can be changed in a variety of ways by the use or omission of individual layers. It is also possible if need be to dispense with the adhesive layers 103, 105, 107 and to connect the individual layers to one another, for example, by means of extrusion lamination. It is only essential to the invention that the outside 5 of the OPP layer 101 forming the outside 5 of the tubular bag packaging is suitable for connecting to the opening device 10, whereas the inner PE layer 108 is designed for processing on the aforementioned tubular bag machine in a heat-sealing manner.

Provision is made according to the invention for the (inner) PE layer 108 to be equipped with a weakening zone 20, which is annular in the exemplary embodiment, in the region of the opening device 10 to be attached. The weakening zone 20 is characterized in that the original thickness D of the PE layer 108 is reduced to a thickness d in the region of said weakening zone 20. Provision can be made in the extreme case for at least the entire PE layer 108 to be completely removed in the region of the weakening zone 20.

The reduction in the thickness in the weakening zone 20 preferably results by means of removing the material of the PE layer 108 or as an alternative if need be by means of a compression of the PE layer 108 for the purpose of a reduction in thickness. It is of importance thereby that the region of the reduced thickness of the PE layer 108 is disposed so as to line up or align with the partial circular diameter T of the cutters 13. Hence, when the cutters 13 are actuated, said cutters only have to sever a PE layer 108 having a reduced thickness when the same make contact with PE layer 108.

Figure 4:
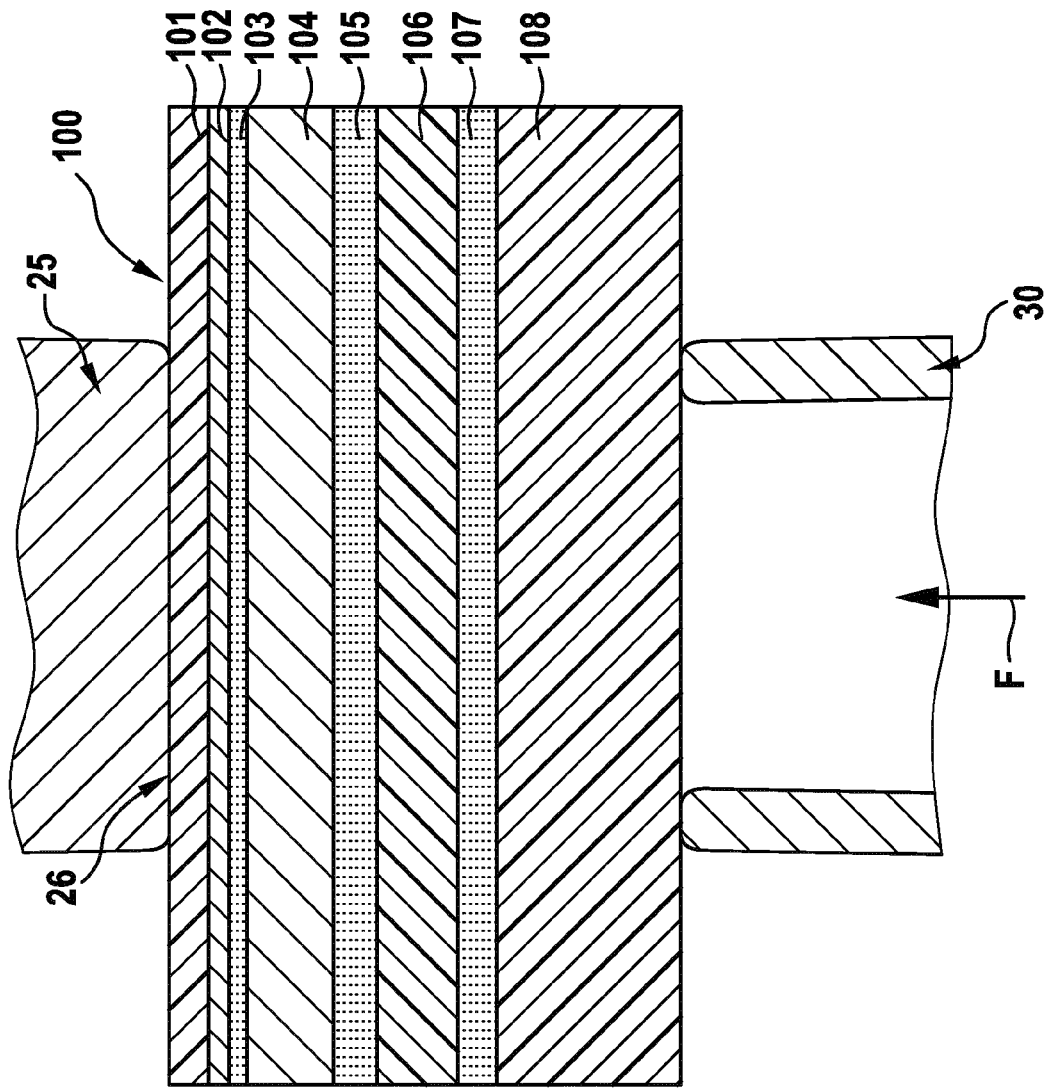

In FIG. 4, the composite film 100 is depicted prior to the formation of the weakening zone 20. The weakening zone 20 is preferably formed by means of an anvil 30 having a circular cross section, which is pressed against the PE layer 108 in the region of the cutters 13 of the opening device 10 with a contact pressing force F. The mean diameter of the anvil 30 corresponds thereby to the partial circular diameter T of the cutters 13.

In alignment with the anvil 30, a sonotrode 25 is pressed from the outer OPP layer 101 against the composite film 100 which preferably has a cylindrical or tapered end 26. The sonotrode 25 is coupled at least indirectly to an ultrasonic source (not depicted) and is operated with a frequency of, for example, 30 kilohertz or 35 kilohertz.

In FIG. 5, the state is depicted in which the weakening zone 20 has been configured in the composite film 100. It can particularly be seen that the thickness of the PE layer 108 on the partial circular diameter T is significantly reduced with respect to the (original) thickness D. This facilitates a severing of the PE layer 108 by means of the cutters 13 when the opening device 10 or more precisely said cutters 13 are actuated.

The weakening zone 20 can, for example, be produced by a packaging material manufacturer (who manufactures the composite film 100) by the weakening zones 20 being spaced apart at equal distances corresponding to the printed image or size of the tubular bag packagings 1 in a composite film web. The composite film 100 built-up as a packaging material roll can subsequently be delivered to the packaging plant for the manufacture of the tubular bag packagings 1. The packer forms the tubular bag packagings 1 on the tubular bag machine previously mentioned and fills said packagings with the bulk good 7. As an alternative, it is, however, also possible to dispose the device for forming the weakening zone 20 directly at the tubular bag machine or at least in the region of the packaging line in the packaging plant.

The composite film 100 described to this point as well as the tubular bag packaging 1 can be altered or modified in a variety of ways without deviating from the concept of the invention. Said concept consists of a selected weakening of the inner packaging material layer of the tubular bag packaging 1 in order to facilitate the severing of the inner packaging material layer by means of the cutters 13 of the opening device 10.

The invention claimed is:

1. A composite film (100) for packaging containers (1), having a film composite made of a plurality of packaging material layers (101 to 108), wherein an inner packaging material layer (108) is designed as a heat-sealing layer and an opening device (10) is fixed to an outer packaging material layer (101), and wherein the packaging material layers (101 to 108) comprise a weakening region (20) in a region of the opening device (10), wherein the weakening region (20) is disposed on a side of the inner packaging material layer (108) and not on a side of the outer packaging material layer, and is implemented as an at least partial reduction in a layer thickness (D) of the inner packaging material layer (108), wherein a shape of the weakening region (20) is adapted to an arrangement of cutters (13) that are disposed on a partial circular diameter (T) of the opening device (10) as a part of the opening device (10).

2. The composite film according to claim 1, characterized in that the inner packaging material layer (108) consists of PE and has a layer thickness between 50 µm and 200 µm.

3. The composite film according to claim 2, characterized in that the inner packaging material layer (108) is removed or compressed in the weakening region (20) at least up to a low thickness (d) of the inner packaging material layer (108).

4. A tubular bag packaging, produced from a composite film (100) according to claim 1.

5. The composite film according to claim 1 wherein the opening device (10) is fixed to the outer packaging material layer (101) by sealing to the outer packaging material layer (101).

6. The composite film according to claim 1 wherein the shape of the weakening region is a circular cross section.

7. The composite film according to claim 1, characterized in that the inner packaging material layer (108) consists of PE and has a layer thickness between 60 µm and 120 µm.

8. A method for producing a composite film (100) made of a plurality of packaging material layers (101 to 108), wherein an inner packaging material layer (108) is designed as a heat-sealing layer and an opening device (10) can be fixed to an outer packaging material layer (101), and wherein the packaging material layers (101 to 108) comprise a weakening region (20) in a region of the opening device (10), wherein the weakening region (20) is disposed on a side of the inner packaging material layer (108) and is implemented as an at least partial reduction in a layer thickness (D) of the inner packaging material layer (108), wherein a shape of the weakening region (20) is adapted to an arrangement of cutters (13) that are disposed on a partial circular diameter (T) of the opening device (10) as a part of the opening device (10), and wherein the inner packaging material layer (108) is reduced at least partially in the layer thickness thereof, characterized in that the weakening region (20) is produced using a tool (30) which is pressed against the inner packaging material layer (108) with a contact pressing force (F) and which interacts with an ultrasonic tool (25) which is applied to the outer packaging material layer (101) of the composite film (100) in alignment with the tool (30).

9. The method according to claim 8, characterized in that the tool (30) has an annular cross section and in that the diameter (A) of the tool (30) is adapted to the partial circular diameter (T) of the cutters (13) of the opening device (10).

10. A tubular bag packaging produced by the method of claim 9.

11. The method according to claim 8, characterized in that the weakening region (20) is produced during the manufacturing process of the composite film (100).

12. The method according to claim 8, characterized in that the weakening region (100) is produced in a region of a packaging machine for producing and filling packaging containers (1).

13. A composite film for packaging containers, having a film composite made of a plurality of packaging material layers, wherein an inner packaging material layer is designed as a heat-sealing layer and an opening device is fixed to an outer packaging material layer, and wherein a weakening region is disposed on a side of the inner packaging material layer and is implemented as an at least partial removal or partial compression of the inner packaging material layer inner surface, wherein a shape of the weakening region is adapted to an arrangement of cutters that are disposed on a partial circular diameter of the opening device as a part of the opening device.

14. The composite film according to claim 13, wherein the inner packaging material layer consists of PE and has a layer thickness between 50 µm and 200 µm.

15. The composite film according to claim 13, wherein the inner packaging material layer consists of PE and has a layer thickness between 60 µm and 120 µm.

16. The composite film according to claim 13 wherein the opening device is fixed to the outer packaging material layer by sealing to the outer packaging material layer.

17. The composite film according to claim 13 wherein the shape of the weakening region is a circular cross section.

18. A packaging container comprising the composite film of claim 13.

* * * * *